United States Patent [19]
Newman

[11] Patent Number: 6,091,329
[45] Date of Patent: Jul. 18, 2000

[54] MONITOR/HANDS-FREE INTERCOM

[75] Inventor: Perran V. L. Newman, Chagford, United Kingdom

[73] Assignee: Evenflo Company, Inc., Vandalia, Ohio

[21] Appl. No.: 08/937,482

[22] Filed: Sep. 25, 1997

Related U.S. Application Data

[63] Continuation-in-part of application No. 08/558,059, Nov. 13, 1995, Pat. No. 5,708,970.

[51] Int. Cl.[7] ...................................................... H04Q 1/48
[52] U.S. Cl. .............................. 340/539; 455/9; 455/67.3; 455/88
[58] Field of Search ........................... 455/88, 67.3, 134, 455/9, 507, 517, 519, 526, 521; 340/539, 573.1, 286.05, 286; 379/38.3

[56] References Cited

U.S. PATENT DOCUMENTS

| | | | |
|---|---|---|---|
| 4,056,817 | 11/1977 | Bachman | 340/235 |
| 4,215,241 | 7/1980 | Pinkney, Jr. | 179/1 |
| 4,777,478 | 10/1988 | Hirsch et al. | 340/573 |
| 4,882,746 | 11/1989 | Shimada | 455/520 |
| 5,159,704 | 10/1992 | Pirolli et al. | 455/62 |
| 5,210,532 | 5/1993 | Knoedler et al. | 340/825.69 |
| 5,533,959 | 7/1996 | Newman et al. | 600/28 |
| 5,542,108 | 7/1996 | Sasuta | 455/462 |
| 5,640,147 | 6/1997 | Chek et al. | 340/573.4 |
| 5,646,593 | 7/1997 | Hughes et al. | 340/573.1 |
| 5,774,038 | 6/1998 | Welch et al. | 340/286.05 |
| 5,812,056 | 9/1998 | Law | 340/539 |

*Primary Examiner*—Dwayne D. Bost
*Assistant Examiner*—Alan T. Gantt
*Attorney, Agent, or Firm*—Robert G. Crouch; Holland & Hart LLP

[57] ABSTRACT

A monitor/hands-free intercom system includes a child unit and a parent unit which are each transceivers. The parent unit operates primarily as a receiver, unless and until a talk switch is actuated on the parent unit, enabling the parent unit to transition to a transmitter. The child unit acts primarily as a transmitter unless and until it detects a carrier signal at the appropriate frequency during one of its short sniff periods. If a carrier signal is detected, the child unit extends the sniff period to look for a non-audible hidden tone encoded into the transmission from the parent unit. If the hidden tone is detected, the child unit transitions to a receiver mode and is able to play back the sound waves detected by the parent unit so that the parent can reassure or provide instructions to the child.

16 Claims, 15 Drawing Sheets

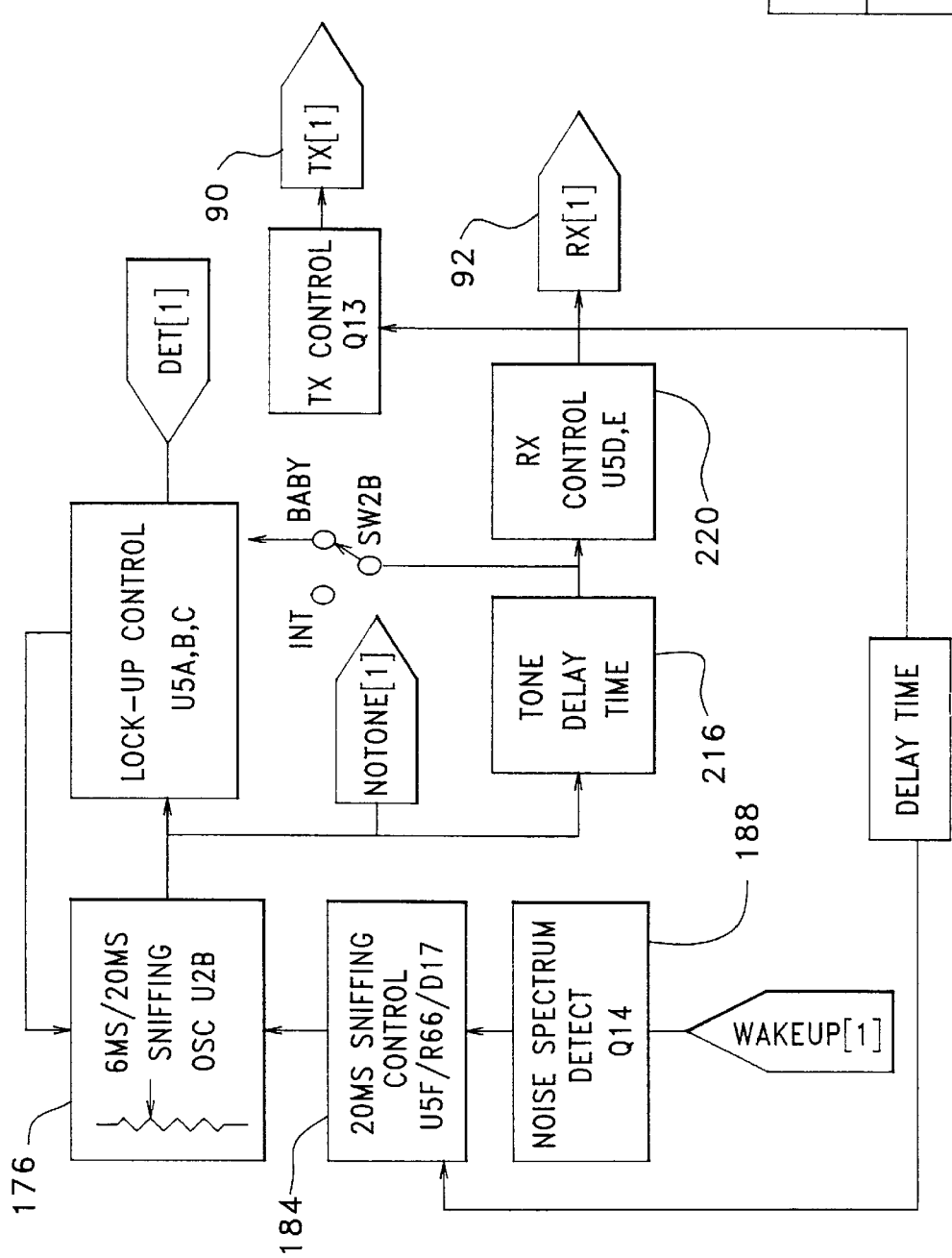

FIG. 7

MONITOR/HANDS-FREE INTERCOM

CROSS-REFERENCE TO OTHER APPLICATIONS

This patent application is a continuation-in-part of U.S. patent application Ser. No. 08/558,059, filed Nov. 13, 1995 now U.S. Pat. No. 5,708,970, and entitled "Wireless Sound Monitoring Apparatus With Subaudible Squelch Control," the contents of which are incorporated herein by reference.

The present invention relates to an improved monitoring system for communication between a child and a parent, and in particular, to an improved monitoring system providing the capability to the parent to place the system into an intercom mode so as to reassure or instruct the child verbally.

BACKGROUND OF THE INVENTION

Traditionally, baby monitor systems have been one-way communication devices. Specifically, a transmitting unit is provided for an infant's room and a receiving unit is provided for an adult so that the adult is able to monitor or hear sounds detected by the transmitting unit. In some of these systems, the transmissions are continuous, while in others a sound-activated mode may be provided in which transmissions are only made when the transmitter unit detects sound waves greater than a predetermined magnitude.

Such monitoring systems have typically been one-way communication devices because there has been little demand to communicate from the adult unit back to the child unit, since the devices are most popular for use with newborn infants. In the case of monitoring newborns, parents typically want to hear every sound generated in the infant's room on a continuous basis without interruption. It has not typically been desired to provide the ability for the parent to speak to the newborn; most likely because the newborn may not be reassured by simply hearing the parent's voice replayed over a monitor, but rather may be frightened by hearing the parent's voice without seeing their face at their bedside.

As infants grow out of the newborn stage, however, it may be desirable for the parent to be able to talk to the infant either to reassure them or to provide instructions to the infant. For example, the parent may want to reassure a crying child and/or tell them to stop crying and go back to sleep. If this functionality were available on a monitoring system, the parent could avoid having to get out of bed in the middle of the night and go to the infant's room. Unfortunately, this functionality requires two-way communication.

Two-way communication devices are typically either full-duplex or half-duplex systems. Full-duplex systems allow for simultaneous transmission and reception by each unit of the system. In other words, the two users of such a system can talk and be heard simultaneously. In order to accomplish this functionality, full-duplex systems typically involve a pair of transceivers (units which are both a transmitter and a receiver) utilizing two separate communication channels, one for each direction. For example, a full-duplex system may be realized on two discrete frequency channels, or on two different sets of electrical conductors or wires connected between the two monitoring units. In the case of radio frequency (RF) communication between the two monitoring units, the two discrete frequency channels must be sufficiently offset from each other to allow full bandwidth communication simultaneously. Such capability in monitoring systems can be relatively expensive to provide. Unfortunately, because of the competitive market for juvenile products, such systems are deemed too expensive to include in baby monitors In addition, with the plethora of consumer, commercial, broadcast, government, and military applications involving RF communications, the RF spectrum is becoming very crowded and two discrete frequency channels may not be available.

Typically, half-duplex systems, which provide for communication in only one direction at a time, include a pair of transceivers that each include a "push-to-talk" button. These devices are commonly known as "walkie-talkies." Such units are designed to function as receivers unless the push-to-talk button is actuated, at which point the transceiver transmits while the button is actuated. There are several issues that arise with such half-duplex systems. Since it is possible for each transceiver to be placed into the transmit mode at the same time, it is possible for one user to attempt to communicate to the other user at the same time that the other user is attempting to communicate to the first user. Clearly, no communication will be made during such instances. Thus, it can be appreciated that these subsystems must be used properly to provide useful communication. To improve the communication between users of half-duplex systems and increase the efficiency thereof, certain hand-off protocols have been developed and continue to be used by serious radio operators. This may include, for example, the use of a certain word to begin a transmission which acknowledges the receipt of the last incoming transmission with a code word such as "Roger." In addition, the user may signify the end of a transmission by using a code word such as "Over" to indicate to the receiving party that the channel is now clear for the receiving party to communicate back to the transmitting party. Unfortunately, such techniques are not likely to be used correctly by many consumers and especially by young children. In addition, young children may not even be able to actuate the talk button.

For these reasons, in order to provide two-way communication employing a half-duplex system without push-to-talk buttons, more sophisticated techniques have been developed. Specifically, a technique known as "sniffing" has been developed for a transceiver to determine when the opposite transceiver is attempting to transmit. This technique is embodied in an earlier product sold by the predecessor of the assignee of the present invention, and known as the "Two-Way Portable Family Intercom," offered as Gerry Model No.605. This system featured several different communication modes, including a one-way mode, a two-way mode, a night mode, and a silent mode. During the two-way mode a child unit acted primarily as a transmitter and a parent unit acted primarily as a receiver. On a periodic basis, however, the child unit would cease transmitting and compare the received signal to a predetermined threshold. If the received signal (primarily, if not entirely, noise) was greater than the predetermined threshold, then the child unit could assume that the parent unit was not transmitting and only noise was being detected. In this case, the child unit would resume transmitting. If, however, the child unit determined that a signal less than the predetermined threshold was being received, then the child unit could assume that the parent unit was transmitting at that time. The child unit would then switch over to receiver mode in which the received signal was converted to an audio signal and played through a loudspeaker in the child unit so that those in the vicinity thereof could hear sound waves representative of the signal transmitted by the parent unit.

There were two disadvantages with this system. First of all, during each of these periodic "sniff" periods when the child unit was not transmitting a signal, the receiver of the parent unit would amplify and play over its loudspeaker a noise signal due to the lack of a transmitted signal from the child unit. This noise signal sounded like a periodic, short click or period of hiss. While it did provide reassurance to the parent that the child unit was in range and was properly conducting its sniff function, the sound was found to be undesirable by some. Furthermore, due to the prevalence of other consumer devices and the like which transmit RF signals, the child unit would occasionally sniff a transmission which did not come from the parent unit. Nevertheless and undesirably, the child unit would transition to the receive mode and either no signal, noise, or an unintended signal would be detected and played over the loudspeaker of the child unit. In addition, during this period when the child unit was in the receive mode, the parent unit would continue to play noise through its loudspeaker.

In the field of communication devices, it is known to provide non-audible or hidden tones in the audio signal as a code for use by the receiver. These hidden tones are typically at a frequency range outside of the core frequency range of human speech and thus outside of the frequency range amplified and played for the user over the loudspeaker of the receiver. For example, radio systems for taxis include hidden tones to turn on only the radio receiver in the taxi requested. Commercially-available circuits are available that incorporate such techniques and may be referred to as Continuous Tone Control Squelch Systems (CTCSS).

It is against this background and the desire to solve the problems of the prior art that the present invention has been developed.

SUMMARY OF THE INVENTION

Accordingly, it is an object of the present invention to provide a combination baby monitor and hands-free intercom.

It is also an object of the present invention to provide improved accuracy in recognizing communications from the opposite transceiver in a hands-free intercom system.

It is further an object of the present invention to provide improved noise control in a hands-free intercom system.

Additional objects, advantages and novel features of this invention shall be set forth in part in the description that follows, and in part will become apparent to those skilled in the art upon examination of the following specification or may be learned by the practice of the invention. The objects and advantages of the invention may be realized and attained by means of the instrumentalities, combinations, and methods particularly pointed out in the appended claims.

To achieve the foregoing and other objects and in accordance with the purposes of the present invention, as embodied and broadly described therein, the present invention is directed to a monitor system including a pair of transceivers. The first transceiver has a first transducer to detect and convert sound waves in the vicinity thereof to a transmitted RF signal representative thereof and a second transducer to detect and convert a received RF signal into sound waves in the vicinity thereof, the first and second transducers operating one at a time, with the one operating being selectable. The second transceiver has a first transducer to detect and convert sound waves in the vicinity thereof to a transmitted RF signal representative thereof, the transmitted RF signal also including a predetermined code inserted therein, and a second transducer to detect and convert a received RF signal into sound waves in the vicinity thereof, the first and second transducers operating one at a time, with the one operating being selectable. The first transceiver primarily has the first transducer selected and the second transceiver primarily has the second transducer selected, to provide communication from the first transceiver to the second transceiver. The second transceiver can select the first transducer when actuated by an operator thereof. The first transceiver periodically selects the second transducer for a predetermined time duration during each period to analyze whether an RF signal is being received and whether the received RF signal includes the predetermined code and, if the predetermined code is included, maintaining the selection of the second transducer to provide communication from the second transmitter to the first transmitter.

The present invention is also directed to a method of providing an intercom function in a primarily one-way monitor system, the monitor system including a first transceiver which primarily transmits signals representative of detected sound waves for reception and transduction into sound waves by a second transceiver, the intercom function providing the capability for the first transceiver to receive signals representative of sound waves detected and sent by the second transceiver. The method includes the steps of the second transmitter receiving a signal indicating the intent of an operator of the second transceiver to transmit signals representative of sound waves detected by the second transceiver, the second transmitter transmitting the signals representative of sound waves detected by the second transceiver, and inserting a predetermined code into the transmission, and the first transmitter periodically ceasing to transmit for predetermined time durations and analyzing the signal received by the first transmitter to determine if the second transmitter is transmitting, and, if so, analyzing the received signal to determine if the predetermined code is being received, and, if so, leaving the first transceiver in a receive mode wherein the received signal is converted to sound waves by a transducer therein.

The present invention is also directed to a monitor system including a first transceiver and a second transceiver. Each transceiver includes a transmitter with a microphone generating a detected signal, a microphone preamplifier receptive of the detected signal and generating an amplified detected signal, a hidden tone generator generating a hidden tone, a modulator receptive of the amplified detected signal and the hidden tone and supplying a modulated signal, an oscillator receptive of the modulated signal and supplying an RF signal, an RF power amplifier receptive of the RF signal and supplying an amplified RF signal. Each transceiver also includes an antenna receptive of the amplified RF signal and generating transmitted electromagnetic waves and also receptive of received electromagnetic waves and supplying a received RF signal. Each transceiver also includes a receiver with an impedance matching network receptive of the received RF signal and generating a matched RF signal, a mixer receptive of the matched RF signal and mixing the matched RF signal with a generated RF signal to produce an IF signal, a demodulator receptive of the IF signal and supplying a demodulated audio signal, a hidden tone detection circuit receptive of the demodulated audio signal and detecting the presence of a hidden tone therein, an audio power amplifier receptive of the demodulated audio signal and supplying an amplified audio signal, and a speaker receptive of the amplified audio signal and supplying sound waves. The first transceiver acts primarily as a transmitter and the second transmitter acts primarily as a receiver, the second transceiver also including a switch to convert the second transceiver to a transmitter while actuated, the first transmitter including a sniffing oscillator to periodically convert the first transceiver to a receiver for predetermined time durations to determine if an RF signal is being received and to maintain the first transceiver as a receiver while the hidden tone from the second transceiver is being detected.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention.

In the Drawings:

FIGS. 3a, 3b, 3c, and 3d are an electrical schematic diagram of the components of an RF and audio section of the parent unit of FIG. 2a.

FIGS. 5a and 5b are a block diagram representation of the functionality of a child unit of the monitor/intercom system of FIG. 1.

FIGS. 6a, 6b, 6c, and 6d are an electrical schematic diagram of the components of an RF and audio sections of the child unit of FIG. 5a.

FIGS. 7a and 7b are an electrical schematic diagram of control circuitry of the child unit of FIG. 5b.

FIG. 8 is a diagram showing how FIGS. 3a and 3b mate together.

FIG. 9 is a diagram showing how FIGS. 3c and 3d mate together.

FIG. 10 is a diagram showing how FIGS. 6a and 6b mate together.

FIG. 11 is a diagram showing how FIGS. 6c and 6d mate together.

DETAILED DESCRIPTION OF THE PREFERRED EMBODIMENTS

Figure 1:
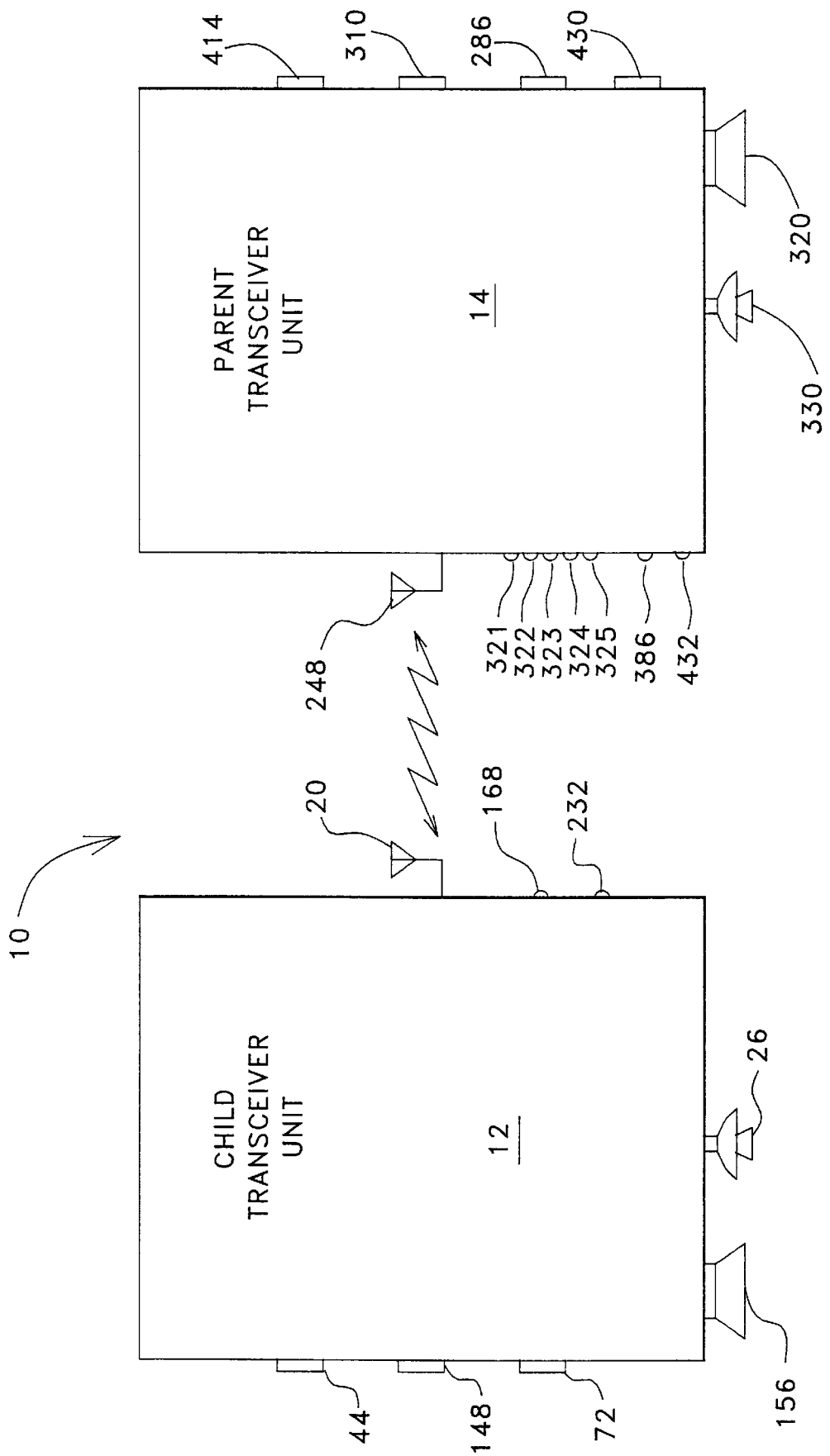
FIG. 1 is a block diagram of the monitor/intercom system of the present invention.

A monitor/intercom system 10 includes a matched pair of transceivers 12 and 14 referred to as the child unit 12 and the parent unit 14, as shown in FIG. 1. As will be described in further detail below, each transceiver unit 12 and 14 includes an antenna, a receive/transmit switch, a receiver including an RF/audio section and a loudspeaker, a transmitter including an RF/audio section and a microphone, associated control electronics, and a plurality of mode switches and indicators. Each of the transceiver units 12 and 14 operate at either of two selectable radio frequencies, either 49.830 or 49.890 megahertz (MHz), or any other frequency in the 49.82 to 49.92 MHz range or 900 MHz range, or any other suitable frequency.

Actuation of the various mode control switches provide for two different basic modes of operation for the system 10. The system 10 can be placed into a continuous transmission mode wherein the child unit 12 acts as a continuous transmitter and the parent unit 14 operates as a continuous receiver. Alternatively, the system 10 can be placed into a two-way intercom mode in which the child unit 12 is primarily a transmitter with brief periodic interruptions to determine whether the parent unit 14 is transmitting, and if so to function as a receiver while the parent unit 14 is transmitting. The parent unit 14 operates primarily as a receiver, unless and until a user operates a "talk" button thereon to transition the parent unit 14 to a transmitter.

Figure 5A:
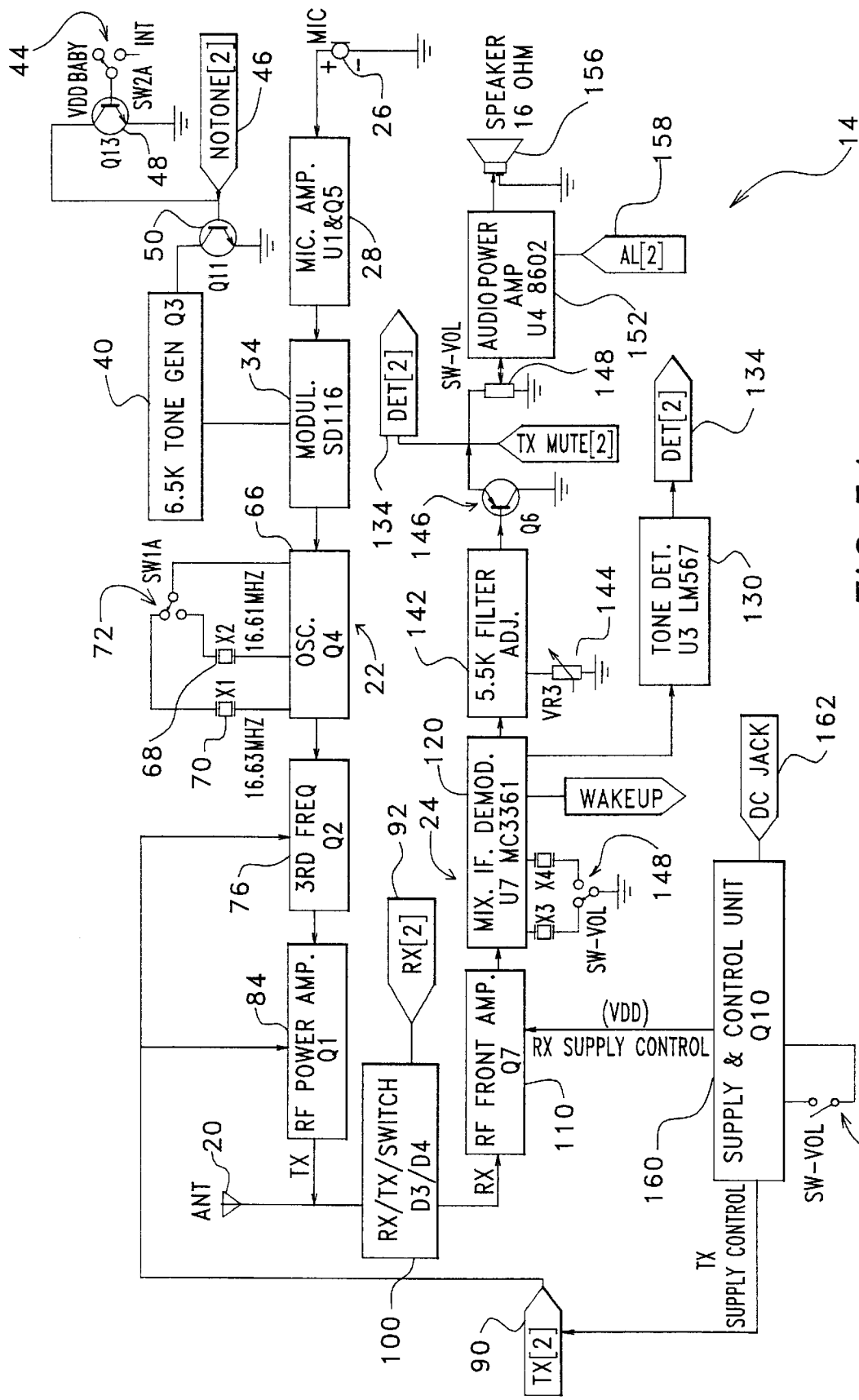
Figure 6A:
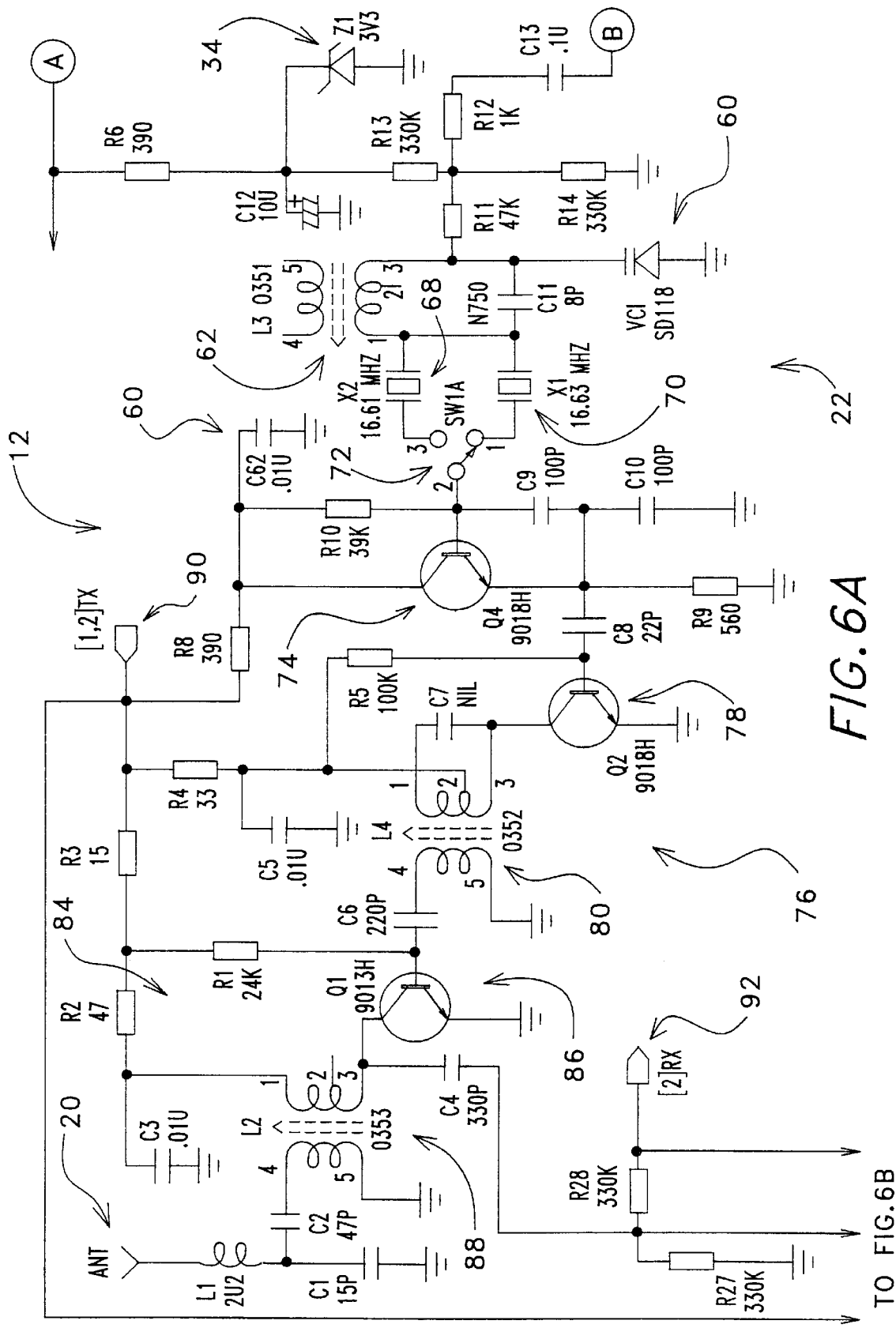
Figure 6B:
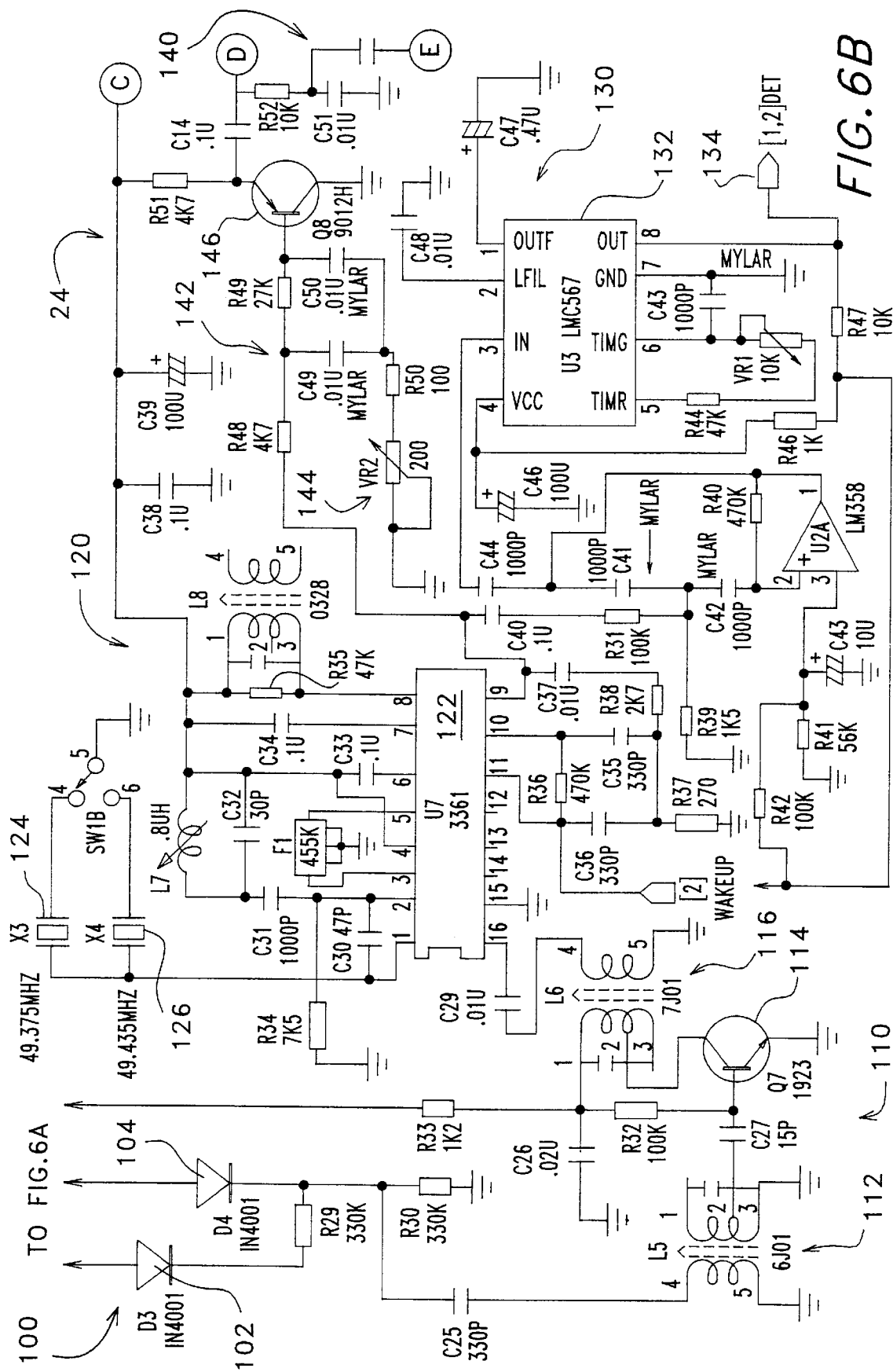
Figure 6C:
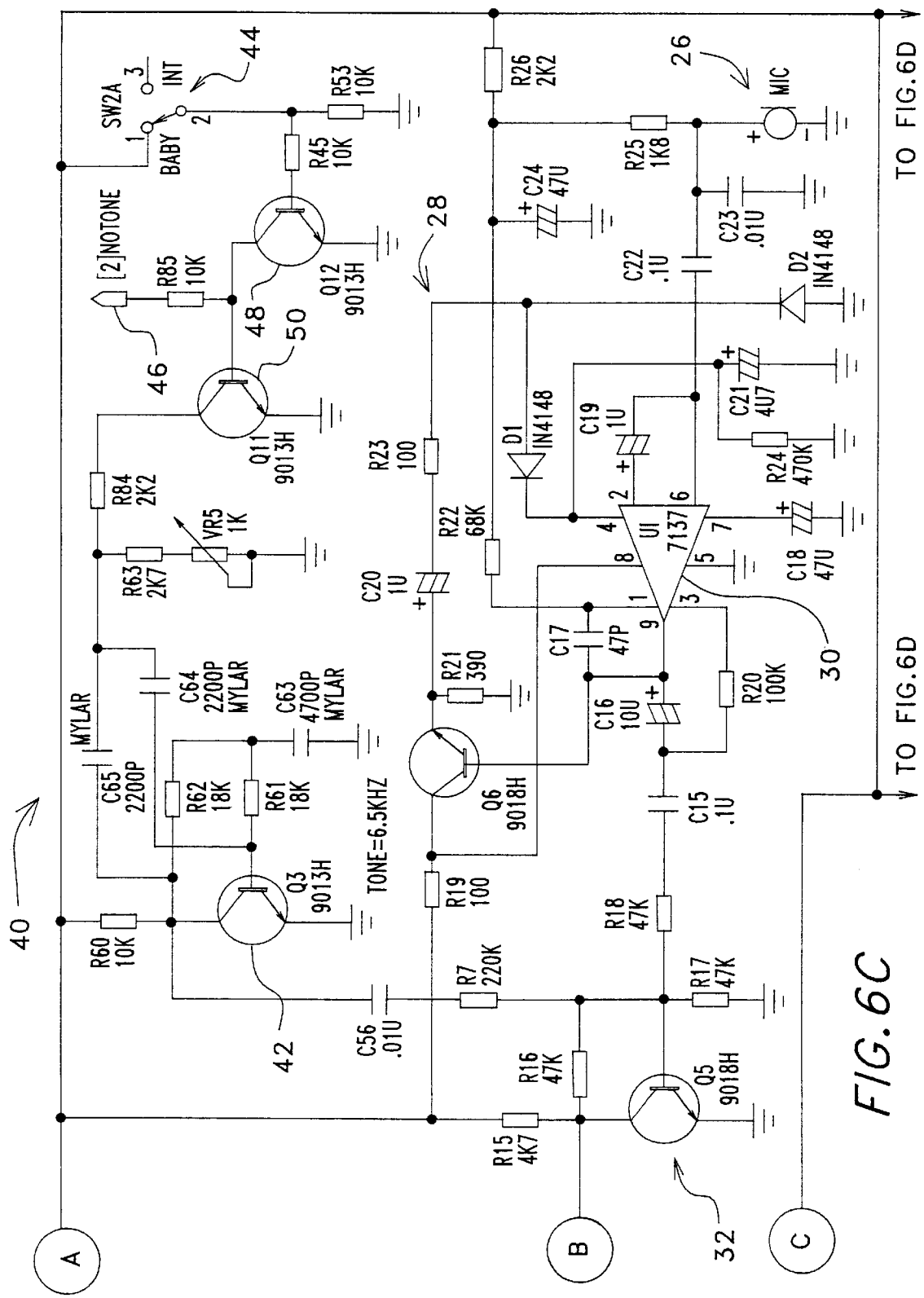
Figure 6D:
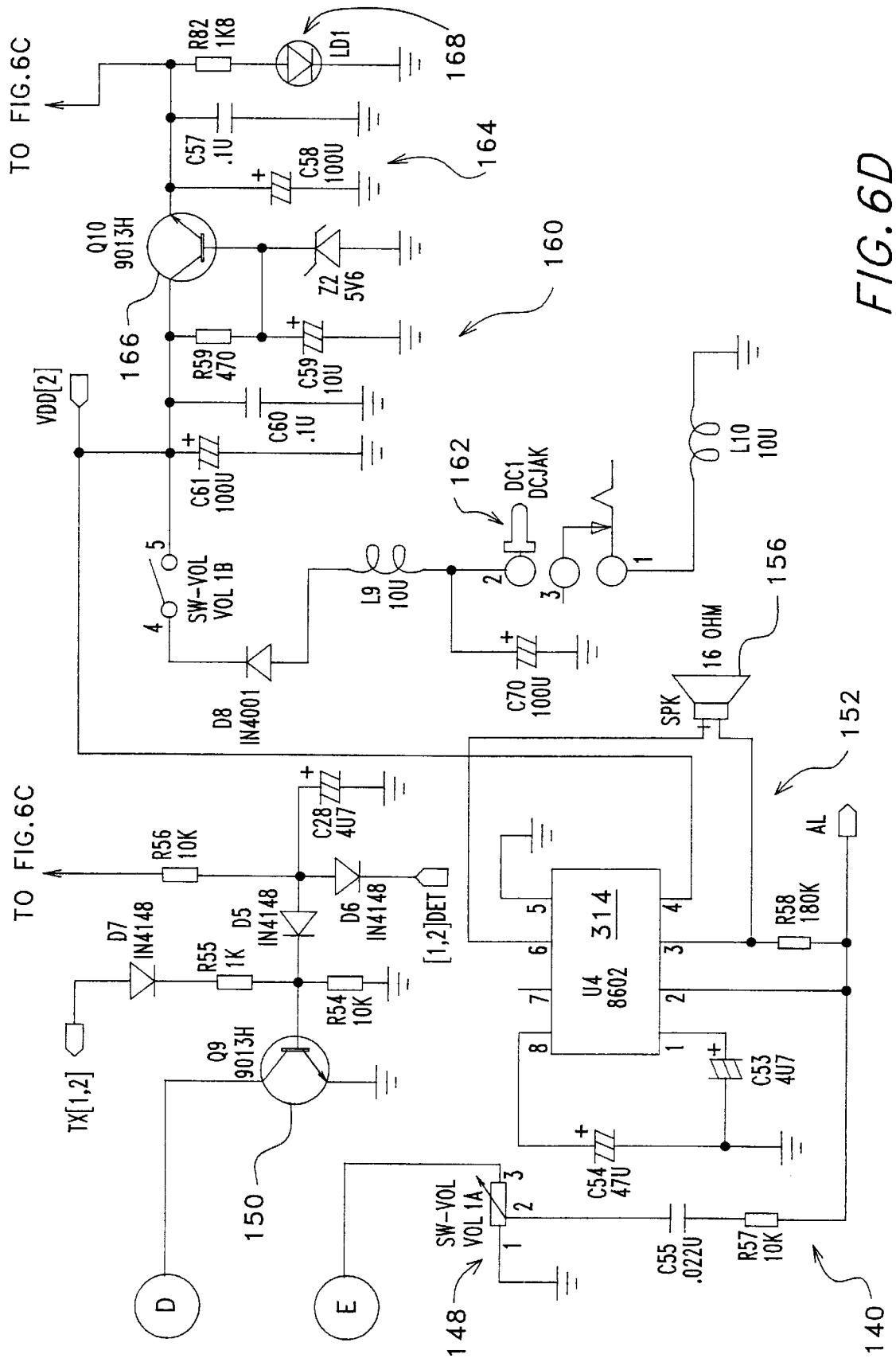

As the components of the child transceiver unit 12 are shown in block diagram form in FIGS. 5a and 5b and in schematic form in FIGS. 6a, 6b, 6c, 6d, and 7, the description will be provided once with the reader able to follow along at either the block diagram level or the schematic level, or both. The child transceiver unit 12 includes an antenna 20 of the flexible coil type. The antenna 20 is connected through an isolation transformer 88 to both the transmitter section 22 of the child unit 12 and the receiver unit 24 of the child unit 12.

The transmit section 22 includes a microphone 26 of the conventional electret type, such as microphones available from Panasonic. The microphone 26 is connected in a conventional manner to a microphone amplifier 28 which includes an audio preamplifier input stage 30, such as a 7137, to provide a relatively undistorted signal with automatic level control. The output of the input stage 30 is supplied to a transistor 32 acting as a mixer. The output of the microphone amplifier 28 is provided to a modulation circuit 34.

A hidden tone generator 40 includes a transistor 42 acting as a phase shift control oscillator which generates a 6.5 Kilohertz (kHz) signal. The output of the tone generator 40 is supplied to the input of the transistor 32 of the microphone amplifier 28 for amplification so that the combination of the detected audio signal from the microphone 26 and the hidden tone signal from the hidden tone generator 40 can be supplied to the modulation circuit 34. The hidden tone generator 40 can be disabled by a monitor (baby)/intercom switch 44 being in the intercom position and a "no-tone" logic signal 46 being in a high condition, via a part of switch transistors 48 and 50. The hidden tone generator 40 can either be turned off or caused to shift significantly in frequency to achieve the desired effect of disabling the tone or code.

The modulation circuit 34 includes a capacitor diode or varactor 60, such as an SD116, and an inductor 62. The combined audio and hidden tone signal is applied to the varactor 60 through a resistor network to vary the voltage applied to the varactor 60 and thus vary the capacitance thereof. By varying the capacitance in this way, the modulation circuit 34 including the inductor 62 will apply a frequency modulated signal to an oscillator circuit 66.

The modulation circuit 34 supplies the frequency-modulated combined audio and hidden tone signal to the oscillator circuit 66 which includes a pair of crystals 68 and 70. The first crystal 68 operates at a frequency of 16.610 MHz and the second crystal 70 operates at 16.630 MHz. A frequency selection switch 72 has contacts which provide the combined audio and hidden tone signal, with either the output of the first crystal 68 or the output of the second crystal 70, to a transistor 74 which is part of the oscillator circuit 66. An output signal from the oscillator circuit 66 is supplied to the input of a frequency multiplier circuit 76.

The frequency multiplier circuit 76 includes a transistor 78 whose output is provided to a transformer 80. The coils of the transformer 80 are arranged in a conventional manner to provide a signal at the output that is three times the input frequency. Thus, the output of the frequency multiplier circuit 76 is centered at either 49.830 MHz or 49.890 MHz depending on the position of the frequency selection switch 72. Of course, due to the frequency modulation discussed above, the signal at the output of the frequency multiplier circuit 76 varies in a range about this carrier frequency.

The output of the frequency multiplier circuit 76 is provided to an RF power amplifier circuit 84. The RF power amplifier circuit 84 includes a transistor 86. The output of the RF power amplifier circuit 84 is coupled through a matching transformer 88 to the antenna 20. A transmit enable signal 90, generated by control circuitry described in detail below, is provided to the frequency multiplier circuit 76 and the RF power amplifier circuit 84 to disable same if the transmit enable signal is at a low level.

The receive section 24 of the child transceiver unit 12 includes a receive/transmit switch 100 which is connected to the matching transformer 88 on the RF power amplifier circuit 84 side thereof. The receive/transmit switch 100 includes a pair of diodes 102 and 104 which act as high-frequency switches. The diodes 102 and 104 allow the presence of the transmit enable signal 90 or the absence of a receive enable signal 92 to disable the receive section 24. If the transmit enable signal 90 is on, then the diode 102 will conduct and block the diode 104 from conducting. The high frequency impedance of the diode 104 is thus very high and the high frequency signal from the matching transformer 88 cannot pass therethrough. The only way the high frequency signal can pass through is to have the diode 104 conducting as a result of the receive enable signal 92.

The output of the receive/transmit switch 100 is provided to an RF front amplifier circuit 110 which includes an inductor 112, a transistor 114, and an inductor 116. The RF front amplifier circuit 110 serves to match the impedance of the antenna 20 to the impedance of a mixer/oscillator/demodulator circuit 120 which is connected to the output of the RF front amplifier circuit 110. By improving the matching between the antenna 20 and the mixer/oscillator/demodulator circuit 120, it is possible to increase the reception of the RF signal received and processed by the receive section 24.

The circuit 120 is largely accomplished in an integrated circuit (IC) 122, such as an MC3361. A pair of crystals 124 and 126 act as local oscillators for the circuit 120. The first crystal 124 supplies a signal of 49.375 MHz and the second crystal 126 supplies a signal of 49.435 MHz. Only one of the outputs of the two crystals 124 and 126 are supplied to the IC 122, based upon the setting of the frequency selection switch 72. The mixer portion of the IC 122 combines the signal from the local oscillator with the signal received by the antenna 20 to supply an intermediate frequency signal in the range of 455 kHz. Note that 455 kHz is the difference between the respective transmit/receive frequencies of 49.830 MHz or 49.890 MHz as compared to the local oscillator signals of 49.375 MHz or 49.435 MHz, respectively. A 455 kHz band-pass filter 128 is provided external to the integrated circuit 122 to filter out any mixed signals outside of the desired frequency range. Next, the integrated circuit 122 frequency demodulates the 455 kHz. signal to produce an output signal from the circuit 120 in the audio signal range. The output of the circuit 120 is provided both to a tone detector circuit 130 and an audio subsection 140.

The tone detector circuit 130 includes an IC 132 such as an LMC567. The IC 132 is a convention tone decoder which is set to detect a signal of 5.5 kHz, corresponding to a hidden tone encoded in the signal supplied by the parent transceiver unit 14. If the hidden tone is detected, a tone detect control signal 134 is supplied by the circuit 130.

The audio subsection 140 includes a 5.5 kHz low-pass filter (with a tunable notch characteristic)142 which is accomplished an R-C circuit and a variable resistor 144. The output of the 5.5 kHz filter 142 includes the audio signal less the portion of the signal in the range of 5.5 kHz and above. This output is supplied to a transistor 146 which can be selectively disabled by the tone detect control signal 134 and/or the transmit enable signal 90. The output of the transistor 146 is supplied to a conventional volume control and on/off switch 148 which supplies a signal of a selected amplitude to an audio power amplifier circuit 152 which may be an IC such as an 8602. The output of the audio power amplifier circuit 152 is supplied to a 16-ohm paper-type loudspeaker 156.

A power supply circuit 160 includes a DC power jack 162 which can be connected to a conventional AC-DC adaptor (not shown) for powering the circuit from a conventional AC power outlet. Alternatively, the DC voltage could be supplied from conventional batteries. The DC voltage supplied through the DC power jack 162 is supplied through contacts of the volume control switch 148 to a regulated supply circuit 164 including a transistor 166 for supplying a regulated supply voltage to all of the circuitry of the child transceiver unit 12. In addition, the output of the regulated supply circuit 164 drives an LED 168 to indicate the child unit 12 is switched to on and is receiving sufficient power.

Figure 7:
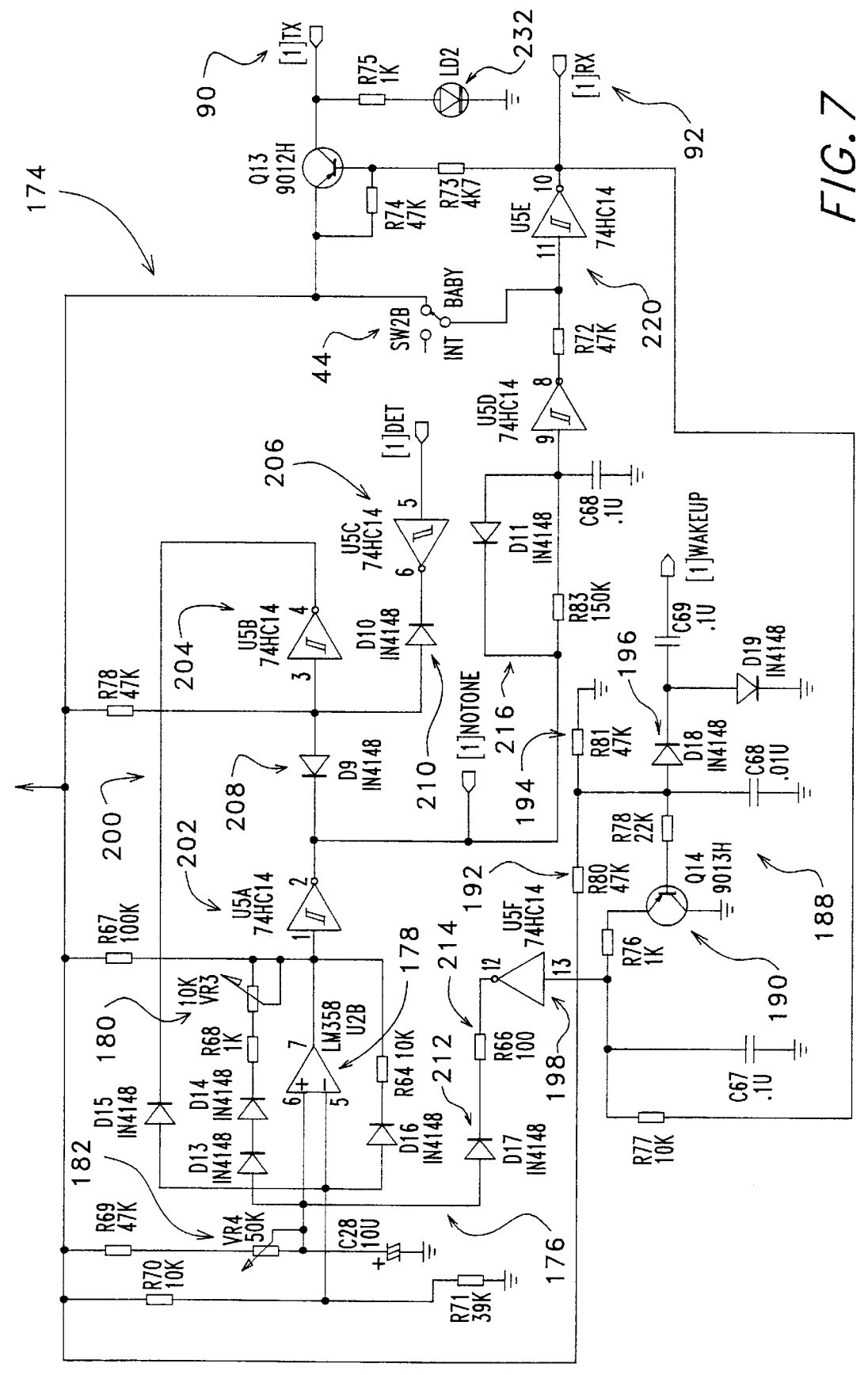

Additional control circuitry 174 in the child transceiver unit 12 is shown in FIGS. 5b and 7. A sniffing oscillator 176, including an operational amplifier 178 such as an LM358, has an output that oscillates in polarity, The oscillations are caused by an R-C network and a feedback loop. The period of the oscillations is approximately 0.6 seconds (600 milliseconds (ms.)) and is variable through adjustment of a variable resistor 182. The time duration that the oscillator has a low (nearly zero or negative) voltage during each 600 ms. period is 6 ms. and is variable through adjustment of a variable resistor 180. The sniff period can be extended to 2 ms. when a diode 212 is turned on and conducts to add an extra resistor 214 to the oscillator 176. The diode 212 is turned on or off by a noise spectrum detector circuit 188.

The noise spectrum detector circuit 188 includes a transistor 190 which is receptive of an audio signal from the mixer/oscillator/demodulator circuit 120. If the noise spectrum detector circuit 188 detects noise above a predetermined threshold, it can be assumed that the parent transmitter unit 14 is not transmitting and the sniff period can be terminated when the adjustable 6 ms. period terminates. The predetermined threshold is related to the voltage at the input of the transistor 190 which will cause the transistor 190 to turn off. This voltage at the input is affected by the component values of the R-C network. If the audio signal from the circuit 120 drops significantly, a diode 196 will turn on and begin to conduct allowing the input voltage to the transistor 190 to drop. When the input voltage drops sufficiently, the transistor 190 will turn off and an inverter 198 will have a low output, causing the diode 212 to conduct and effect the pulse duration of the sniffing oscillator 176 to extend the pulse duration from approximately 6 ms. to approximately 20 ms., as described above. Thus, if the signal detected by the noise spectrum detector circuit 188 is below the predetermined threshold, it can be assumed that the parent transceiver unit 14 is attempting to communicate to the child transceiver unit 12 and the sniff period is extended to 20 milliseconds to look for the valid detection of a 5.5 kHz tone by the tone detector circuit 130.

A lockup control circuit 200 includes three inverting amplifiers 202, 204, and 206 which are connected together to achieve the following logic: if either the output of the sniffing oscillator 176 goes high, or the detect control signal 134 goes high (signifying the lack of a tone detect signal), the respective inverting amplifiers 202 and 206 will provide a low output (turning off the no-tone logic signal 46 and, after a time delay of a few ms., turning off the receive enable signal 92 and turning on the transmit enable signal 90) which through diodes 208 and 210 pulls the input of the inverting amplifier 204 low and thus the output high to allow the sniffing oscillator 176 to begin oscillating as normal. However, if both the detect control signal 134 goes low (indicating the valid detection of a hidden tone) and the output of the sniffing oscillator 176 is low, the inverting amplifier 204 will supply a low signal which leaves the sniffing oscillator 176 in a low condition and which turns on the no-tone logic signal 46 and, after a time delay of a few ms. achieved by the tone delay timer circuit 216, causes the receive enable signal 92 to turn on and the transmit enable signal 90 to turn off. By disabling the tone a certain time delay before disabling transmission, the squelch tail is suppressed. This prevents the transmit section 22 of the child transceiver unit 12 from operating and effectively leaves the child transceiver unit 12 in a receive mode until such time as the continuous hidden tone from the parent transceiver unit 14 is no longer detected. However, if the monitor (baby)/intercom switch 44 is in the monitor (baby) position, the receive enable signal 92 is kept off and the transmit enable signal 90 is kept on. In addition, when the transmit enable signal 90 is on, an LED 232 is driven to provide a visible indication thereof. During the time that the detect control signal 134 is low and the output of the sniffing oscillator 176 is low, the inverter 204 will have a low output and will effectively lock-up the sniffing oscillator 176 and prevent further oscillations until such time as the detect control signal goes high.

Figure 2A:
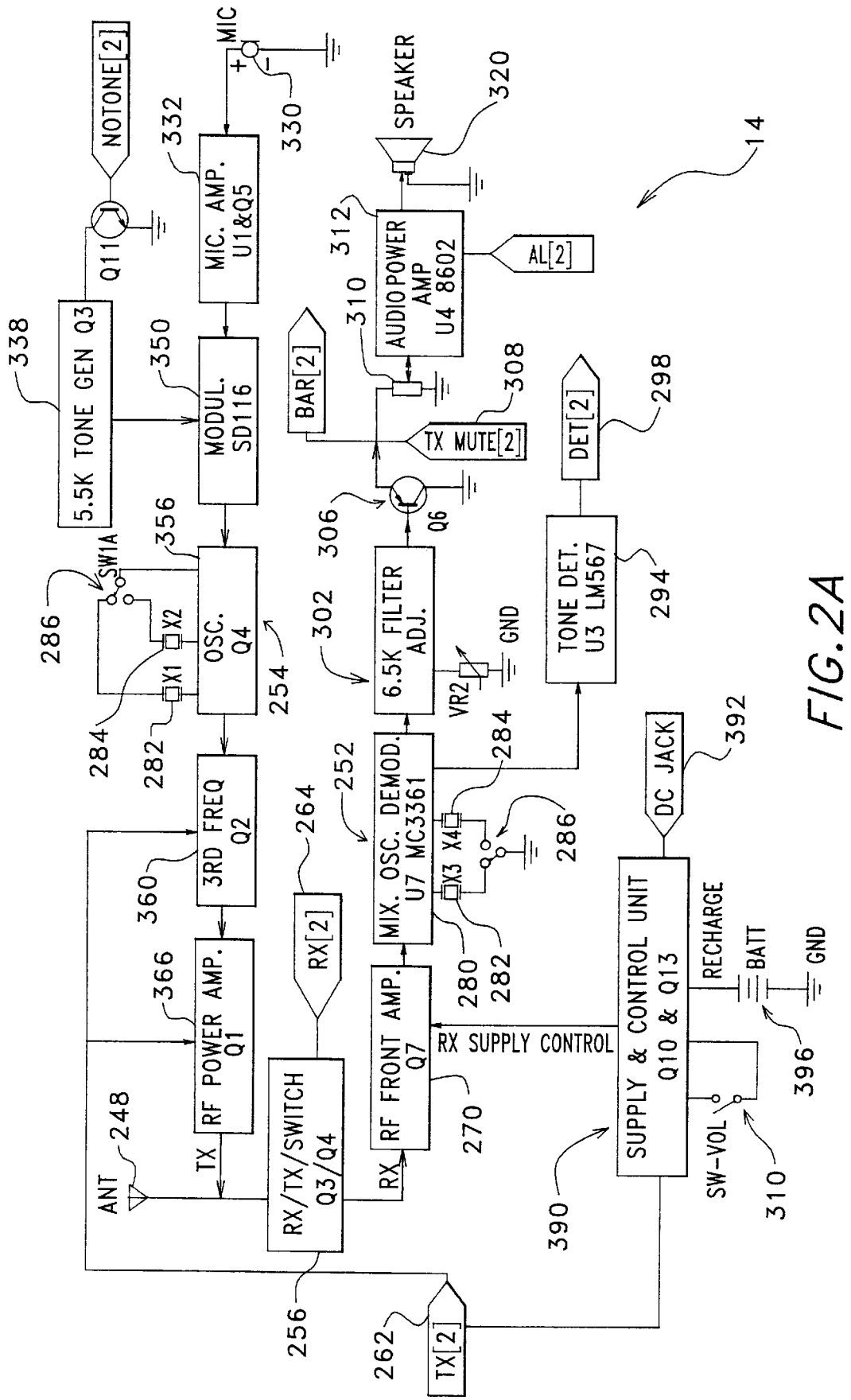
FIGS. 2a and 2b are a block diagram representation of the functionality of a parent unit of the monitor/intercom system of FIG. 1.

The parent transceiver unit will now be described. As the components of the parent transceiver unit 14 are shown in block diagram form in FIGS. 2a and 2b and in schematic form in FIGS. 3a, 3b, 3c, 3d, and 4, the description will be provided once with the reader able to follow along at either the block diagram level or the schematic level, or both. The parent transceiver unit 14 includes an antenna 248 which is coupled through a matching transformer 250 to both a transmit section 252 and a receive section 254.

The receive 254 section includes a receive/transmit switch 256 which includes diodes 258 and 260. The diodes 258 and 260 act as high-frequency switches to allow a transmit enable signal 262 or the lack of a receive enable signal 264, respectively, to disable the receive section 254 in a similar fashion to the switch 100. The output of the receive/transmit switch 256 is supplied to an RF front amplifier 270 that includes an inductor 272, a transistor 274, and an inductor 276 which operate to match the impedance between the antenna 248 and the receive section 254 in a similar manner to the RF front amplifier circuit 110 of the child transceiver unit 12.

The output of the RF front amplifier unit 270 is supplied to a mixer/oscillator/demodulator circuit 280 which is similar to the mixer/oscillator/demodulator circuit 120 of the child transceiver unit 12. In a similar fashion, crystals 282 and 284 supply local oscillator frequencies of 49.375 MHz and 49.435 MHz, respectively, with the selected one of the two crystals 282 and 284 being used based upon the setting of a frequency selection switch 286. The local oscillator signal is supplied to an IC 288, such as an MC3361, which performs the mixing and demodulation functions. The received signal from the antenna 248 is mixed with the selected local oscillator signal to create a 455 kHz signal which is passed through a 455 kHz band-pass filter 290 to remove unwanted frequency components. The output of the filter 290 is supplied to a demodulator internal to the IC 288 which supplies a pair of output signals in the audio frequency range.

One of the output signals of the IC 288 goes to a tone detector circuit 294 which includes an IC such as an LMC567, a conventional tone decoder, and is configured to detect a hidden tone of 6.5 kHz in the audio signal sent by the child unit 12. If such a hidden tone is detected, a low level signal is supplied at an output thereof, the signal being known as a detect control signal 298.

Another audio output of the integrated circuit 288 is supplied to a 6.5 kHz low-pass filter (with a tunable notch characteristic) 302 which filters out the hidden tone frequency of 6.5 kHz and above. The output of the 6.5 kHz filter 302 is supplied to a transistor 306 where the output signal can be disabled by the presence of a mute signal 308 or the transmit enable signal 262. The output of the transistor 306 is supplied to a bar-graph control IC 316 which is used to drive five LEDs 321, 322, 323, 324, and 325 for an indication of the received sound level.

The output of the transistor 306 is also supplied through a volume control and on/off switch 310 to an audio power amplifier circuit 312. The audio power amplifier circuit 312 receives the audio signal at a selected level from the volume control switch 310 and amplifies same to provide a suitable signal to a 16-ohm paper-type loudspeaker 320. Preferably, the audio power amplifier circuit 312 may be an IC 314 such as an 8602, a conventional audio power amplifier. An alarm signal 422 of a few kHz may be supplied by an alarm circuit described below to the audio power amplifier circuit 312 to provide an audible indication through the loudspeaker 320 of an alarm condition (the loss of the detect control signal 298) signifying that the child unit 12 is not operating or is out of range.

The transmit section 252 of the parent transceiver unit 14 includes a microphone 330 of the conventional electret type which is connected to a microphone amplifier circuit 334. The microphone amplifier circuit 334 includes an audio preamplifier input stage, such as a 7137, to amplify the signals detected by the microphone 330 and provide a relatively undistorted signal with automatic level control.

A hidden tone generator circuit 338 includes a transistor 340 operating as a phase shift control oscillator to provide a 5.5 kHz hidden tone. Note that the parent unit 14 generates a 5.5 kHz hidden tone and looks for a 6.5 kHz hidden tone from the child unit 12. Conversely, the child unit 12 generates a 6.5 kHz hidden tone and looks for a 5.5 kHz hidden tone from the parent unit 14. The hidden tone generator 338 of the parent unit 14 can be disabled by the presence of a no-tone signal 342 which can be applied to a transistor 344.

The output of the hidden tone generator circuit 338 and the microphone amplifier circuit 332 are summed together at the input of a summing transistor 348. The output of the summing transistor 348 is provided to a modulation circuit 350 that includes a capacitor diode or varactor 346, such as an SD116, and an inductor 347. The combined audio and hidden tone signal is applied to the varactor 346 through a resistor network to vary the voltage applied to the varactor 346 and thus vary the capacitance thereof. By varying the capacitance in this way, the modulation circuit 350 including the inductor 347 will apply a frequency modulated signal to an oscillator circuit 356.

The modulation circuit 350 supplies the frequency-modulated combined audio and hidden tone signal to the oscillator circuit 356 through one of a pair of crystals 352 and 354. The first crystal 352 supplies a signal of 16.610 MHZ while the second crystal 354 supplies a signal of 16.630 MHZ. The setting of the frequency selection switch 286 controls which of the two carrier frequencies from the crystals 352 and 354, together with the combined hidden tone signal and amplified audio signal, are supplied to the input of a transistor 358 whose output is supplied to a frequency multiplier circuit 360 to drive a transistor 362 therein. The output of the transistor 362 drives a transformer 364 which serves to triple the input frequency of the signal into the frequency multiplier circuit 360, so that the output of the multiplier circuit 360 is at the desired transmit frequency of either 49.830 MHZ or 49.890 MHZ. The output of this frequency multiplier circuit 360 is supplied to the input of an RF power amplifier circuit 366 which includes a driving transistor 368, which in turn couples the signal to be transmitted through the matching transformer 250 to the antenna 248. The frequency multiplier circuit 360 and RF power circuit 366 can be disabled by the absence of the transmit enable signal 262.

A power supply circuit 390 includes a DC power jack 392 receptive of DC power such as may be available from a conventional AC/DC adaptor (not shown) connected to a conventional AC power outlet. The DC voltage is supplied to a constant charging transistor 394 which supplies a constant charging current to a 4.8 volt rechargeable battery 396. The DC voltage is also supplied through contacts of the volume control switch 310 to a voltage control regulator transistor 398 for supplying a regulated DC voltage to the remainder of the parent transceiver unit 14.

Figure 2B:
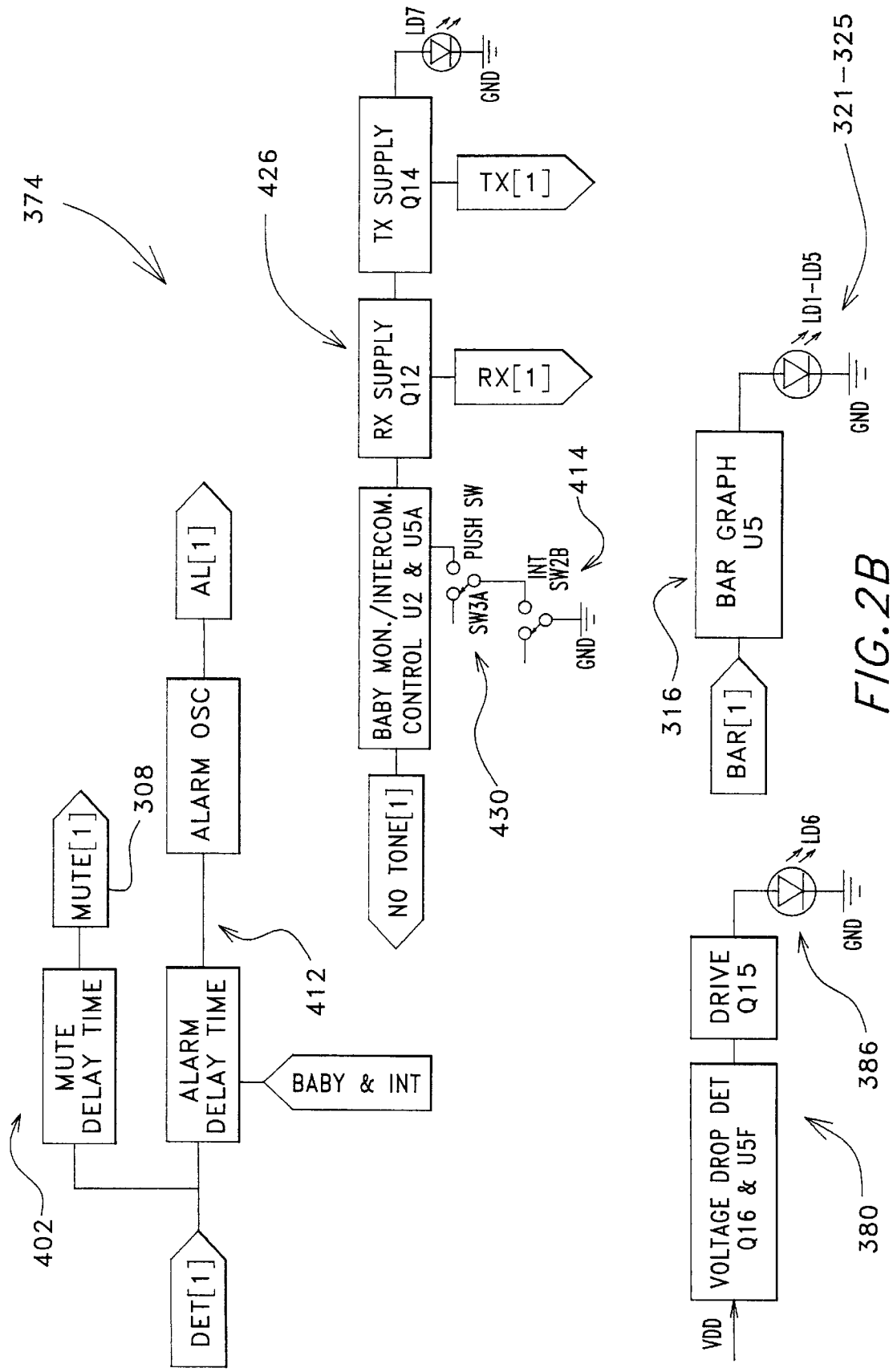
Figure 3A:
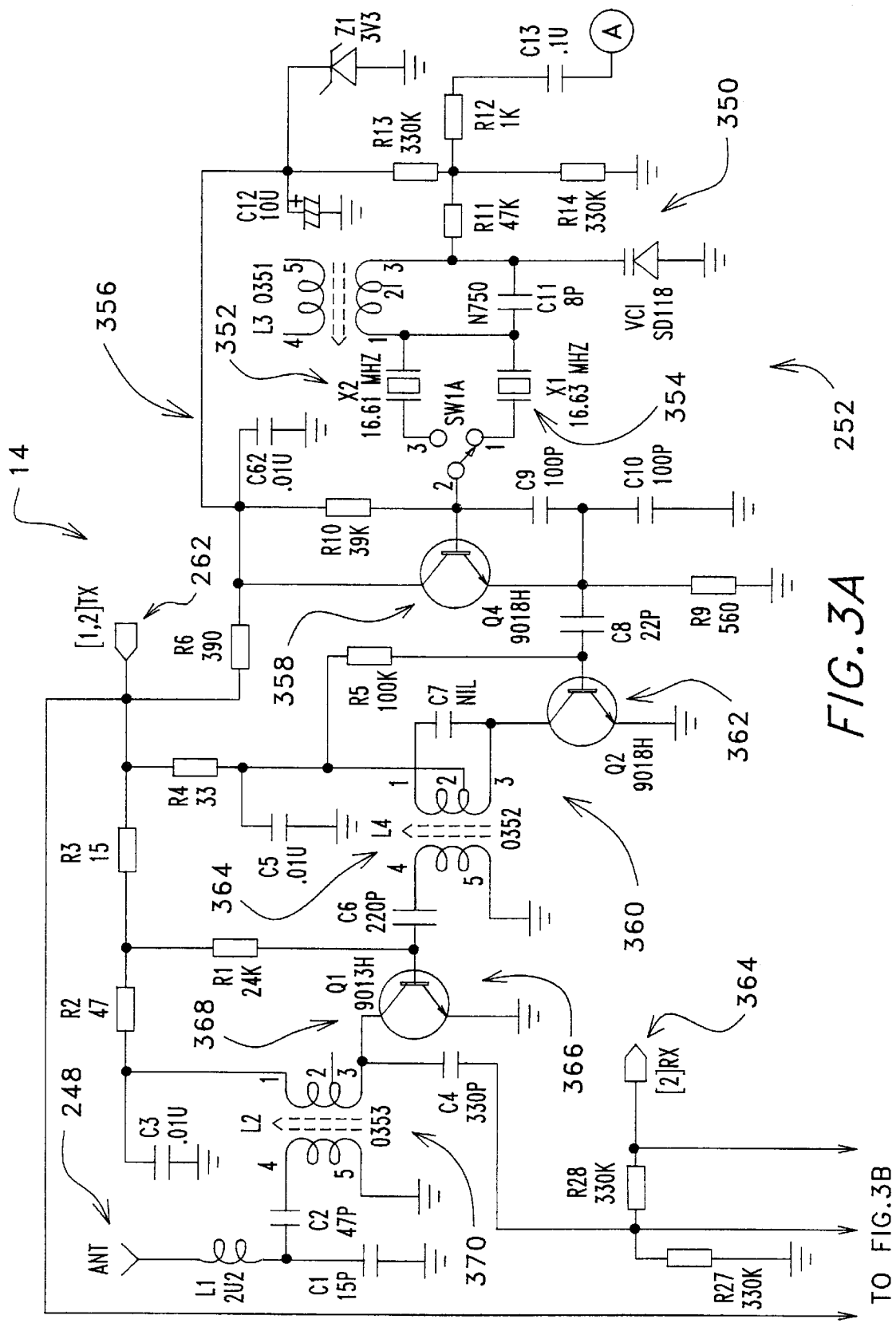
Figure 3B:
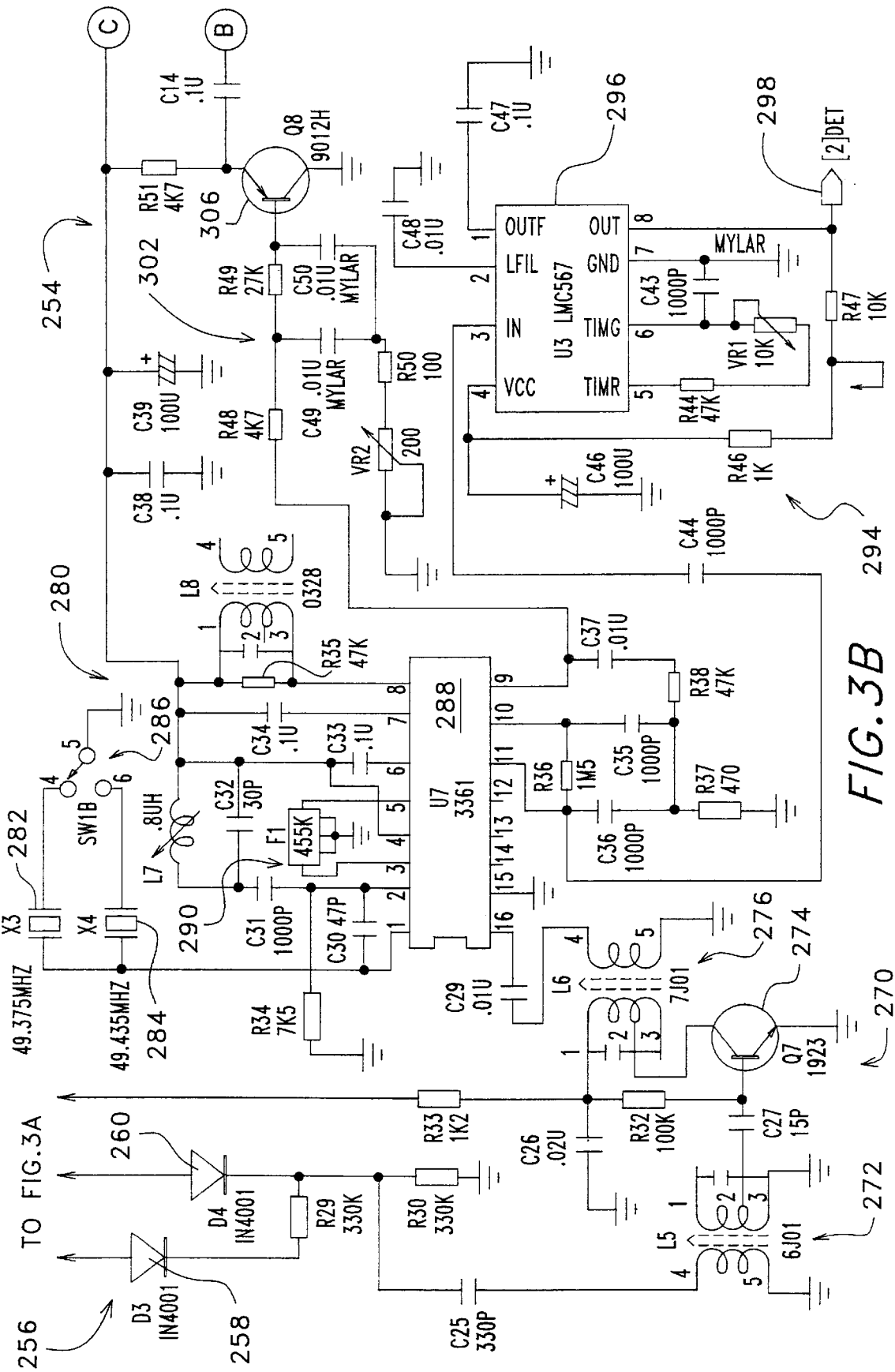
Figure 3C:
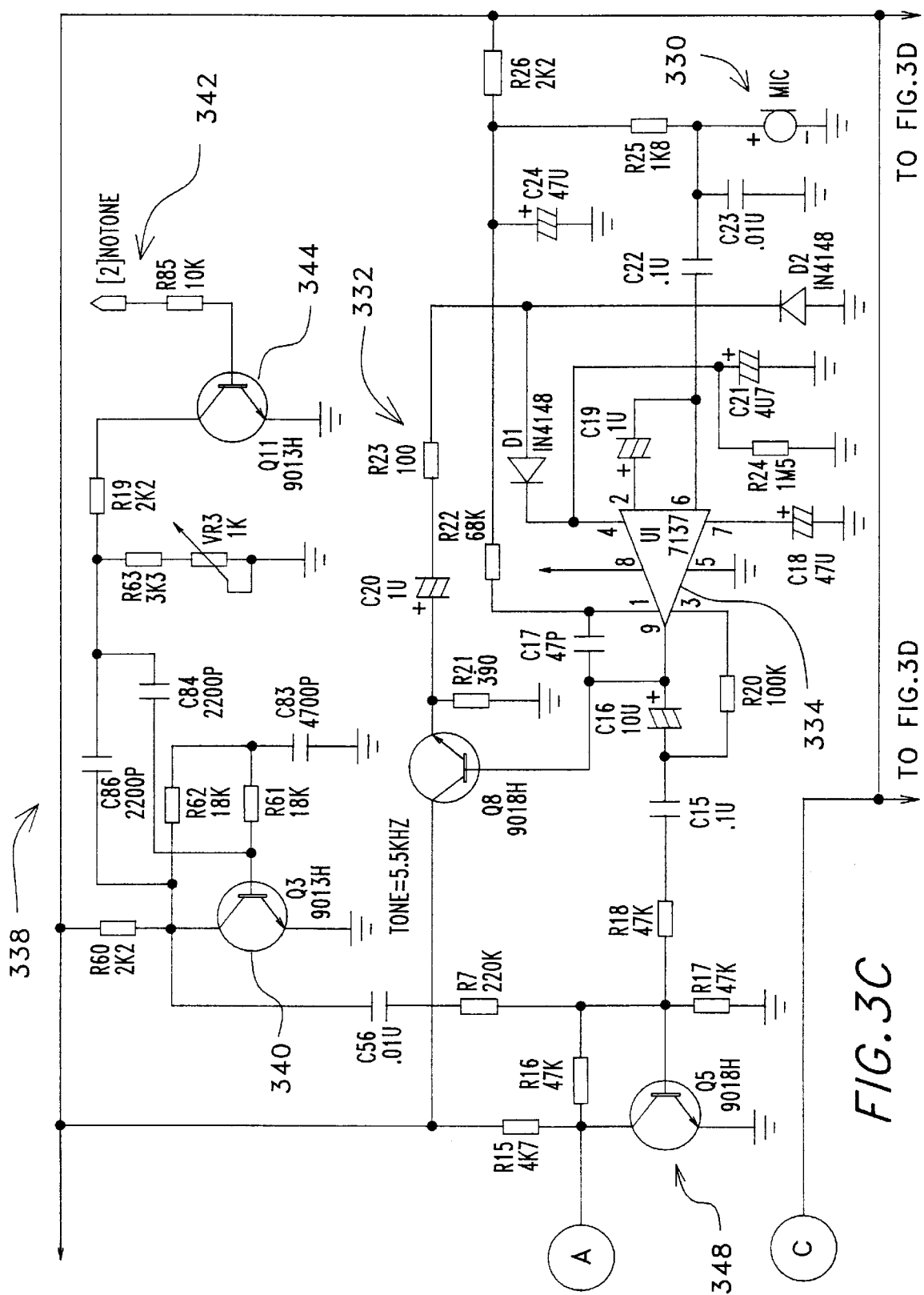
Figure 3D:
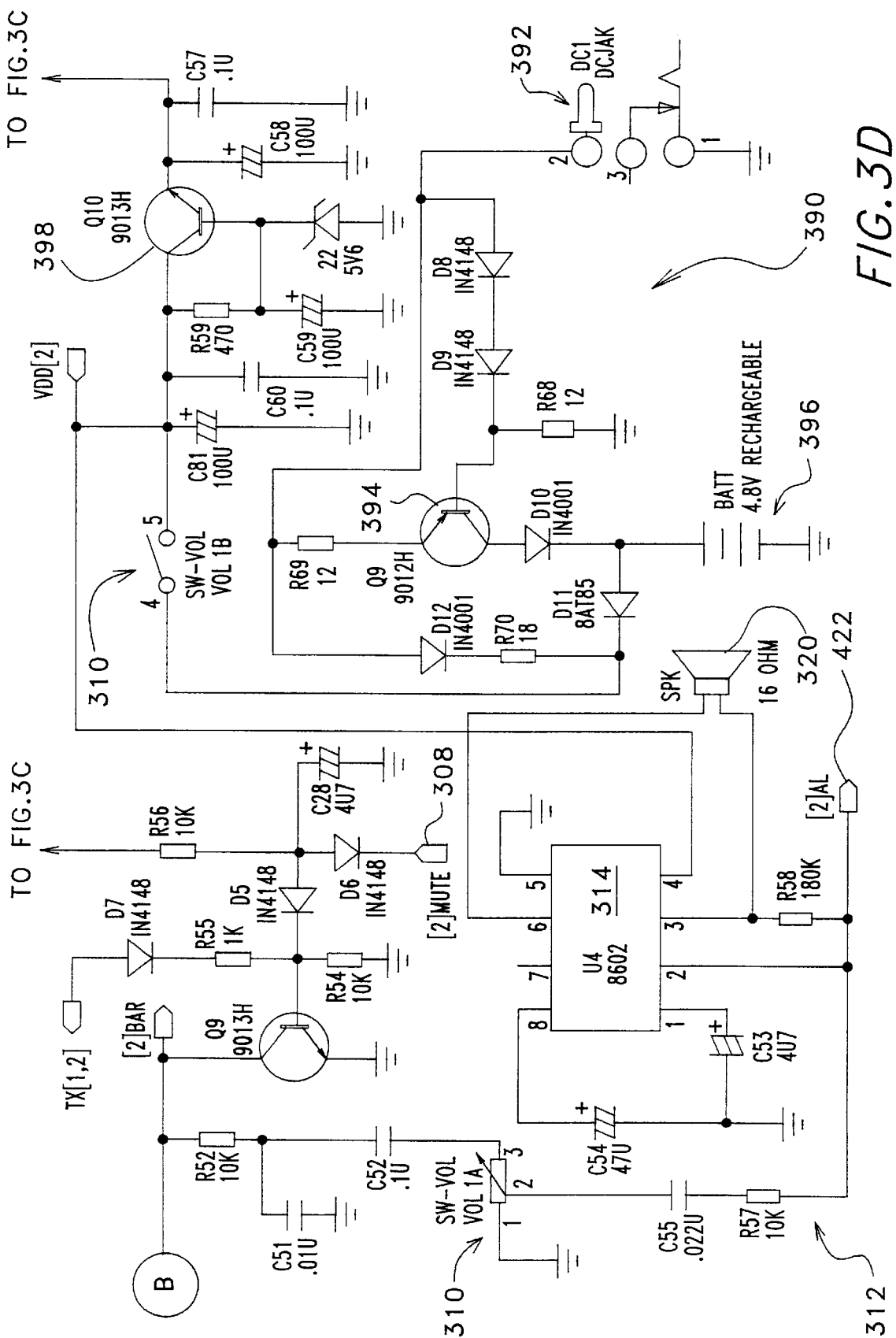
Figure 4:
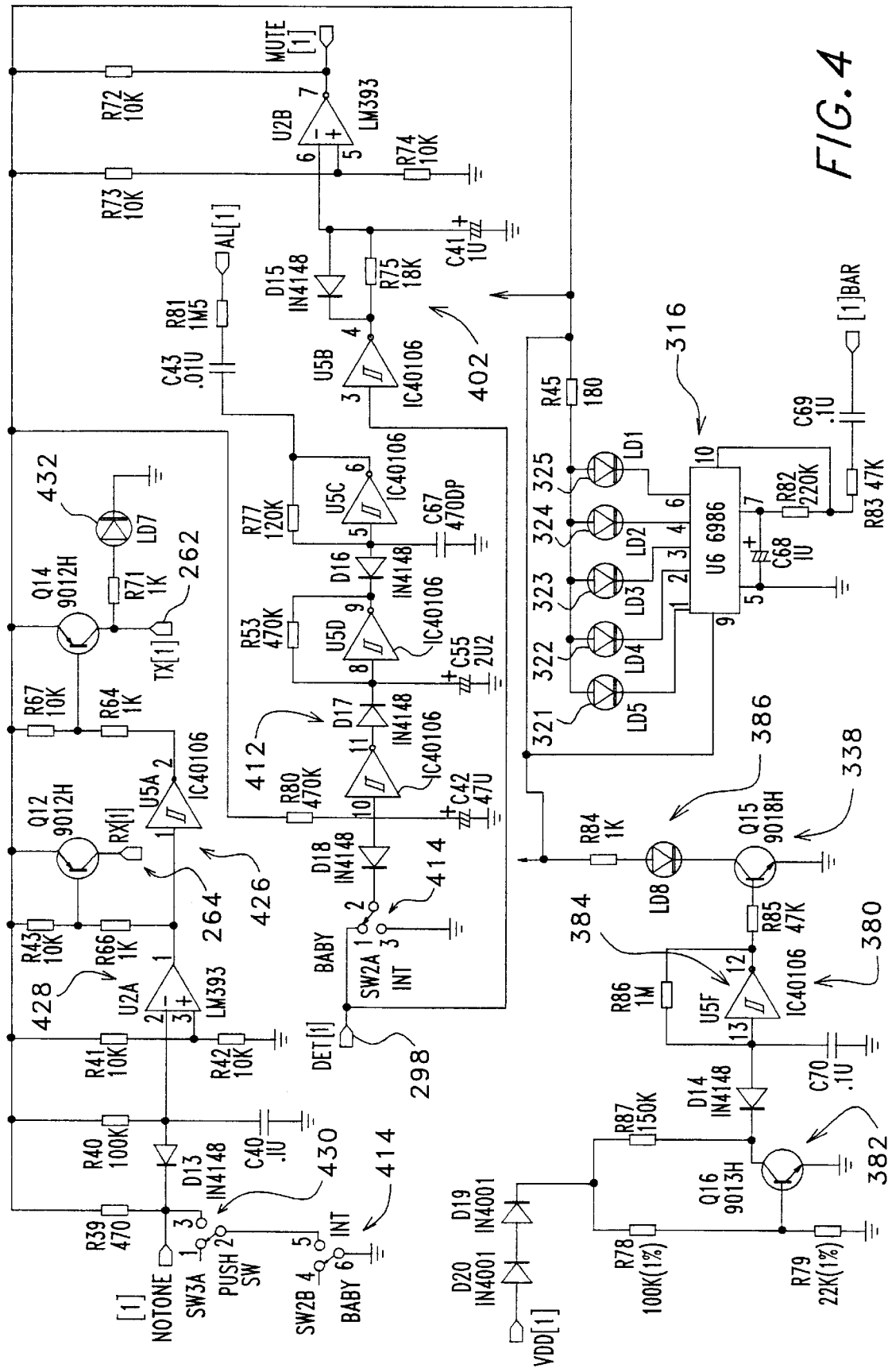
FIG. 4 is an electrical schematic diagram of the components of control circuitry of the parent unit of FIG. 2b.

Additional control circuitry 374 in the parent transceiver unit 14 is shown in FIGS. 2b and 4. The circuitry 374 includes the bar-graph control IC 316, such as a 6966. A voltage drop detector (VDD) 380 receives a VDD signal from the power supply circuit 390 and includes an amplifier transistor 382 and an inverting amplifier 384 which can drive an LED 386 through a drive transistor 388 when the DC voltage has dropped below a desired level.

A mute delay timer circuit 402 includes an inverter 404 that turns the valid (low condition) tone detect control signal 298 to a high signal after the inverter 404. This signal is applied to the negative side of a differential amplifier 406, such as an LM 393. This large signal at the negative input of the differential amplifier 406 causes a negative signal for the mute signal 308. On the hand, when the tone detect control signal 298 is off (a high condition), the inverter 404 converts this to a low signal which is applied to the negative input of the differential amplifier 406 and results in a high condition at the mute signal 308.

An alarm circuit 412 routes the tone detect control signal 298 through a monitor (baby)/intercom switch 414. If the switch 414 is in the intercom mode, the alarm circuit 412 is disabled. If, however, the switch 414 is in the monitor (baby) position, and the tone detect control signal 298 is off (high condition), then the alarm circuit including three inverting amplifiers 416, 418, and 420 with feedback loops and R-C networks will begin oscillating at a few kHz to provide an alarm control signal 422 which can produce an audible signal through the audio power amplifier circuit 312 and loudspeaker 320, as described above. Alternatively, if the parent unit is provided without a monitor (baby)/intercom switch, the detect control signal 298 will be wired directly to the alarm circuit 412 so that any time the detect control signal 298 is lost, the alarm circuit 412 is oscillating.

A transmit/receive selection circuit 426 includes a differential amplifier 428 whose positive input terminal is provided with half the supply voltage and whose negative input terminal is effected by the conditions of the monitor (baby)/intercom switch 414 and a talk switch 430. If the monitor (baby)/intercom switch 414 is in the monitor (baby) position, then the transmit/receive selection circuit 426 causes the receive enable signal 264 to be enabled and the transmit enable signal 262 to be disabled. In addition, the no-tone signal 342 will be enabled. If, on the other hand however, the monitor (baby)/intercom switch 414 is in the intercom position, and if the talk switch 430 is in the talk position, then the no-tone signal 342 is disabled and the transmit/receive selection circuit 426 causes the receive enable signal 264 to be disabled and the transmit enable signal 262 to be enabled. When the transmit enable signal 262 is enabled, an indicator LED 432 is illuminated. The talk switch 430 may be a switch in which it is off in a central position and on in either a locked position to one side or in a position to another side which must be held by the operator or it will spring back to the off position under the force of a spring (not shown). Alternatively, the talk switch 430 may be a normally-open switch in which the operator may push the switch against the force of a spring (not shown) to cause contact of the switch to cause the talk switch 430 to be closed or turned on. As a further alternative, if the parent unit 14 is provided without a monitor (baby)/intercom switch 414, the talk switch 430 will be operative to connect the input of the transmit/receive selection circuit 426 and the no-tone signal 342 directly to ground when the talk switch 430 is activated.

There are, of course, various suitable alternatives to non-audible hidden tones. For example, instead of a hidden tone, any other type of code could be employed including digital techniques, a variety of tones, or any other unique modulation scheme. In addition, although the core frequency range of normal human hearing is in the range of 300 to 3000 Hz the standard for basic telecommunication systems such as telephones to communicate human speech, it would be possible to provide codes within this frequency range and notch them out. In addition, in some areas where frequency modulation above 3 kHz is not permitted, the hidden tones could be in the lower range below 300 Hz, such as in the range of 67 to 250 Hz. It should also be noted that some humans can hear very low audio frequencies in the range of 20 Hz and some very high audio frequencies in the range of 20 kHz.

Operation

As can be appreciated from the description above, the two units 12 and 14 of the system 10 must each have the same frequency selected with the frequency selection switches 72 and 430 in order to communicate to each other. The on/off and volume control switches 148 and 310 must be turned on. If the monitor (baby)/intercom switch 44 of the child transceiver unit 12 is in the monitor (baby) position, the child transceiver unit 12 will only transmit signals via its antenna and will not perform the sniffing function. When the switch 44 is in this position, the similar switch 414 of the parent transceiver unit 14 should be placed into the monitor (baby) position. In this position, the parent unit 14 will act only as a receiver, regardless of the position of the talk switch 430. If, however, the parent unit 14 is not provided with a monitor (baby)/intercom switch 414, then the unit 14 will monitor the position of the talk switch 430 and may attempt to transmit through its antenna 248 at times when the child transceiver unit 12 is also transmitting.

If it is desired to use the system 10 as a two-way intercom, the monitor (baby)/intercom switch 44 of the child unit 12 can be placed into the intercom position and the monitor (baby)/intercom switch 414 of the parent unit 14 can also be placed into the intercom position, if such a switch 414 is provided. In this mode, the child unit 12 will act primarily as a transmitter and the parent unit 14 will act primarily as a receiver. The child unit 12 will, however, on a periodic basis of approximately 600 ms., and for a duration of approximately 6 ms., momentarily convert to a receiver and determine if a signal is being received from the parent unit. If not, the child unit 12 will resume being a transmitter. During the time period when the child unit 12 is sniffing in this manner, the hidden tone signal is removed from the transmission from the child unit 12 a few milliseconds before ceasing transmission through the antenna 20. Because of this delay between disabling the hidden tone and ceasing transmission, the parent transceiver unit 14 will disable the audio section thereof prior to being in a condition of receiving no carrier. Because of this, there will be no squelch tail, click, or hiss heard at the parent unit 14.

If the parent unit 14 does have the talk switch 430 selected and is transmitting, the child unit 12 will determine that the noise spectrum received is below the predetermined threshold and will extend the sniffing period up to 20 ms. to look for the presence of a hidden tone from the parent unit 14. If the hidden tone is detected, the child unit will convert to a receiver and play an audible signal through its loudspeaker 156 representative of the signal detected by the microphone 330 of the parent unit. The child unit 12 will remain in the receiver mode until such time as the hidden tone is no longer detected, at which point it will revert to the transmitter mode.

The volume of the sound played through the loudspeakers 156 and 320 can be adjusted by positioning of the on/off volume control switches 148 and 310, respectively. The child unit 12 includes an LED 168 to indicate that it is on and has an appropriate amount of power and an LED 232 to indicate that it is transmitting. The parent unit 14 includes an LED 386 which is illuminated when the available voltage to the parent unit 14 has dropped below a predetermined level and an LED 432 to indicate that the parent unit 14 is transmitting. In addition, the parent unit 14 includes five LEDs 321–325 which together provide a visible indication of the sound level being received from the child unit 12.

Advantages

It can be appreciated that the system 10 of the present invention solves many of the problems of the prior art including providing two-way communication with a half duplex system without undesirable noise provided at the parent unit 14 when the child unit 12 is sniffing. In addition, the child unit 12 does not undesirably transition to a receive mode whenever signals are detected of approximately the correct frequency, but instead only transitions when a proper code or hidden tone is detected. Thus, the system 10 can remain in a primarily monitor mode so that the parent can monitor the conditions in the vicinity of the child unit 12 with very infrequent or insignificant interruptions unless and until the parent decides to communicate back to the child unit 12 through the parent unit 14. Only in this case will the child unit 12 become a receiver and the parent unit 14 become a transmitter. This provides an increased level of peace of mind for the parent who is monitoring a child and decreases the need to visit the child's room in the middle of the night.

The foregoing description is considered as illustrative only of the principles of the invention. Furthermore, since numerous modifications and changes will readily occur to those skilled in the art, it is not desired to limit the invention to the exact construction and process shown as described above. Accordingly, all suitable modifications and equivalents may be resorted to falling within the scope of the invention as defined by the claims which follow.

The invention claimed is:

1. A monitor system, comprising:

a first transceiver having a first transducer to detect and convert sound waves in the vicinity thereof to a transmitted RF signal representative thereof and a second transducer with a first portion to detect and convert a received RF signal into an audio signal and a second portion to convert the audio signal to sound waves in the vicinity thereof, the first and second transducers operating one at a time, with the one operating being selectable; and a second transceiver having a first transducer to detect and convert sound waves in the vicinity thereof to a transmitted RF signal representative thereof, the transmitted RF signal also including a predetermined code inserted therein, and a second transducer to detect and convert a received RF signal into sound waves in the vicinity thereof, the first and second transducers operating one at a time, with the one operating being selectable;

wherein the first transceiver primarily and automatically has the first transducer selected and the second transceiver primarily and automatically has the second transducer selected, to provide communication from the first transceiver to the second transceiver, and wherein the second transceiver can select the first transducer of the second transceiver when actuated by an operator thereof, and further wherein the first transceiver automatically and periodically disables the first transducer of the first transceiver and enables the first portion of the second transducer for a predetermined time duration during each period to analyze whether an RF signal is being received and whether the received RF signal includes the predetermined code and, if the predetermined code is included, maintaining the selection of the second transducer to provide communication from the second transmitter to the first transmitter.

2. A monitor system, comprising:

a first transceiver having a first transducer to detect and convert sound waves in the vicinity thereof to a transmitted RF signal representative thereof and a second transducer with a first portion to detect and convert a received RF signal into an audio signal and a second portion to convert the audio signal to sound waves in the vicinity thereof, the first and second transducers operating one at a time, with the one operating being selectable; and a second transceiver having a first transducer to detect and convert sound waves in the vicinity thereof to a transmitted RF signal representative thereof, the transmitted RF signal also including a predetermined code inserted therein, and a second transducer to detect and convert a received RF signal into sound waves in the vicinity thereof, the first and second transducers operating one at a time, with the one operating being selectable;

wherein the first transceiver primarily has the first transducer selected and the second transceiver primarily has the second transducer selected, to provide communication from the first transceiver to the second transceiver, and wherein the second transceiver can select the first transducer of the second transceiver when actuated by an operator thereof, and further wherein the first transceiver periodically disables the first transducer of the first transceiver and enables the first portion of the second transducer for a predetermined time duration during each period to analyze whether an RF signal is being received and whether the received RF signal includes the predetermined code and, if the predetermined code is included, maintaining the selection of the second transducer to provide communication from the second transmitter to the first transmitter;

wherein the predetermined code includes a hidden tone.

3. A monitor system as defined in claim 2, wherein the hidden tone is a tone outside of the core range of humanly-perceptible audio frequency.

4. A monitor system as defined in claim 3, wherein the hidden tone is greater than approximately 5 kHz.

5. A monitor system as defined in claim 3, wherein the hidden tone is less than approximately 1 kHz.

6. A monitor system as defined in claim 2, wherein the first transceiver also inserts a hidden tone into its transmissions when the first transducer is selected, and the second transceiver only produces sound waves when the hidden tone is received.

7. A monitor system as defined in claim 6, wherein the hidden tone inserted by the first transceiver is different than the hidden tone inserted by the second transceiver.

8. A monitor as defined in claim 7, wherein the hidden tones are greater than approximately 5 kHz.

9. A monitor system, comprising:
   a first transceiver having a first transducer to detect and convert sound waves in the vicinity thereof to a transmitted RF signal representative thereof and a second transducer with a first portion to detect and convert a received RF signal into an audio signal and a second portion to convert the audio signal to sound waves in the vicinity thereof, the first and second transducers operating one at a time, with the one operating being selectable; and
   a second transceiver having a first transducer to detect and convert sound waves in the vicinity thereof to a transmitted RF signal representative thereof, the transmitted RF signal also including a predetermined code inserted therein, and a second transducer to detect and convert a received RF signal into sound waves in the vicinity thereof, the first and second transducers operating one at a time, with the one operating being selectable;
   wherein the first transceiver primarily has the first transducer selected and the second transceiver primarily has the second transducer selected, to provide communication from the first transceiver to the second transceiver, and wherein the second transceiver can select the first transducer of the second transceiver when actuated by an operator thereof, and further wherein the first transceiver periodically disables the first transducer of the first transceiver and enables the first portion of the second transducer for a predetermined time duration during each period to analyze whether an RF signal is being received and whether the received RF signal includes the predetermined code and, if the predetermined code is included, maintaining the selection of the second transducer to provide communication from the second transmitter to the first transmitter;
   wherein the first transceiver also inserts a predetermined code into its transmissions when the first transducer is selected, and the second transceiver only produces sound waves when the predetermined code is received;
   wherein the first transceiver disables the code momentarily before each periodic selection of the second transducer.

10. A monitor system as defined in claim 2, wherein the predetermined time period is approximately 0.6 seconds.

11. A monitor system as defined in claim 2, wherein the predetermined time duration is approximately 6 ms.

12. A monitor system as defined in claim 2, wherein the predetermined time duration includes a first predetermined time duration to determine if an RF signal is being received and a second predetermined time duration which is only entered if an RF signal is being received, the second predetermined time duration existing to determine if the predetermined code is being received.

13. A monitor system as defined in claim 12, wherein the first predetermined time duration is approximately 6 ms.

14. A monitor system comprising:
   a first transceiver having a first transducer to detect and convert sound waves in the vicinity thereof to a transmitted RF signal representative thereof and a second transducer with a first portion to detect and convert a received RF signal into an audio signal and a second portion to convert the audio signal to sound waves in the vicinity thereof, the first and second transducers operating one at a time, with the one operating being selectable; and
   a second transceiver having a first transducer to detect and convert sound waves in the vicinity thereof to a transmitted RF signal representative thereof, the transmitted RF signal also including a predetermined code inserted therein, and a second transducer to detect and convert a received RF signal into sound waves in the vicinity thereof, the first and second transducers operating one at a time, with the one operating being selectable;
   wherein the first transceiver primarily has the first transducer selected and the second transceiver primarily has the second transducer selected, to provide communication from the first transceiver to the second transceiver, and wherein the second transceiver can select the first transducer of the second transceiver when actuated by an operator thereof, and further wherein the first transceiver periodically disables the first transducer of the first transceiver and enables the first portion of the second transducer for a predetermined time duration during each period to analyze whether an RF signal is being received and whether the received RF signal includes the predetermined code and, if the predetermined code is included, maintaining the selection of the second transducer to provide communication from the second transmitter to the first transmitter;
   wherein the predetermined time duration includes a first predetermined time duration to determine if an RF signal is being received and a second predetermined time duration which is only entered if an RF signal is being received, the second predetermined time duration existing to determine if the predetermined code is being received;
   wherein the sum of the first predetermined time duration and the second predetermined time duration is approximately 20 ms.

15. A method of providing an intercom function in a primarily one-way monitor system, the monitor system including a first transceiver which primarily transmits signals representative of detected sound waves for reception and transduction into sound waves by a second transceiver, the intercom function providing the capability for the first transceiver to receive signals representative of sound waves detected and sent by the second transceiver, the method comprising the steps of:
   the second transceiver receiving a signal indicating the intent of an operator of the second transceiver to transmit signals representative of sound waves detected by the second transceiver;

the second transceiver transmitting the signals representative of sound waves detected by the second transceiver, and inserting a predetermined code into the transmission; and the first transceiver automatically and periodically ceasing to transmit for predetermined time durations and analyzing the signal received by the first transceiver to determine if the second transceiver is transmitting, and, if so, analyzing the received signal to determine if the predetermined code is being received, and, if so, leaving the first transceiver in a receive mode wherein the received signal is converted to sound waves by a transducer therein.

16. A monitor system, comprising:

a first transceiver and a second transceiver, each transceiver including:
- a transmitter including:
  - a microphone generating a detected signal;
  - a microphone preamplifier receptive of the detected signal and generating an amplified detected signal;
  - a hidden tone generator generating a hidden tone;
  - a modulator receptive of the amplified detected signal and the hidden tone and supplying a modulated signal;
  - an oscillator receptive of the modulated signal and supplying an RF signal;
  - an RF power amplifier receptive of the RF signal and supplying an amplified RF signal;
  - an antenna receptive of the amplified RF signal and generating transmitted electromagnetic waves and also receptive of received electromagnetic waves and supplying a received RF signal; and
- a receiver including:
  - an impedance matching network receptive of the received RF signal and generating a matched RF signal;
  - a mixer receptive of the matched RF signal and mixing the matched RF signal with a generated RF signal to produce an IF signal;
  - a demodulator receptive of the IF signal and supplying a demodulated audio signal;
  - a hidden tone detection circuit receptive of the demodulated audio signal and detecting the presence of a hidden tone therein;
  - an audio power amplifier receptive of the demodulated audio signal and supplying an amplified audio signal; and
  - a speaker receptive of the amplified audio signal and supplying sound waves;

wherein the first transceiver acts primarily as a transmitter and the second transmitter acts primarily as a receiver, the second transceiver also including a switch to convert the second transceiver to a transmitter while actuated, the first transmitter including a sniffing oscillator to periodically convert the first transceiver to a receiver for predetermined time durations to determine if an RF signal is being received and to maintain the first transceiver as a receiver while the hidden tone from the second transceiver is being detected.

* * * * *